United States Patent
Ceotto et al.

(10) Patent No.: US 11,197,577 B2
(45) Date of Patent: Dec. 14, 2021

(54) DEVICE FOR CLEANING A FILTER HOLDER OF A COFFEE MACHINE

(71) Applicant: CMA MACCHINE PER CAFFE' S.R.L., Susegana (IT)

(72) Inventors: Beppino Ceotto, Susegana (IT); Rossetto Giovanni, Susegana (IT)

(73) Assignee: CMA MACCHINE PER CAFFE' S.R.L., Susegana (IT)

( * ) Notice: Subject to any disclaimer, the term of this patent is extended or adjusted under 35 U.S.C. 154(b) by 609 days.

(21) Appl. No.: 15/558,233

(22) PCT Filed: Mar. 17, 2016

(86) PCT No.: PCT/IB2016/051504
§ 371 (c)(1),
(2) Date: Sep. 14, 2017

(87) PCT Pub. No.: WO2016/147140
PCT Pub. Date: Sep. 22, 2016

(65) Prior Publication Data
US 2018/0042423 A1 Feb. 15, 2018

(30) Foreign Application Priority Data

Mar. 17, 2015 (IT) .......................... MI2015A000409

(51) Int. Cl.
*A47J 31/60* (2006.01)
*A47J 31/06* (2006.01)

(52) U.S. Cl.
CPC ........... *A47J 31/60* (2013.01); *A47J 31/0657* (2013.01)

(58) Field of Classification Search
CPC ......... A47J 31/60; A47J 31/44; A47J 31/0657

USPC .................................................. 99/275, 279
See application file for complete search history.

(56) References Cited

U.S. PATENT DOCUMENTS

| 4,151,626 A | 5/1979 | Bertaglia | |
|---|---|---|---|
| 2004/0250454 A1* | 12/2004 | Jager | E01H 5/061 37/266 |
| 2008/0041231 A1* | 2/2008 | Beharry | A47J 31/54 99/279 |

(Continued)

OTHER PUBLICATIONS

International Preliminary Report on Patentability issued for PCT/IB2016/051504 dated Sep. 28, 2017.

(Continued)

*Primary Examiner* — Erin E McGrath
(74) *Attorney, Agent, or Firm* — Silvia Salvadori

(57) ABSTRACT

The device for cleaning a filter holder of a coffee machine comprises a support body for supporting the filter holder, a motor on whose shaft scraping elements are assembled for removing the used coffee grounds contained in the internal chamber of the filter holder and at least one brush with a plurality of bristles to collect the residual of the used coffee grounds.
The device comprises activation elements for activating the motor and controlled by the correct positioning of the filter holder adapted to receive the scraping elements and the brush, a collection member for collecting the used coffee grounds extracted from the filter holder by the scraping elements. The support body has a housing in which the filter holder is positioned and the scraping elements have at least one plough blade to remove the used coffee grounds from the chamber.

9 Claims, 2 Drawing Sheets

(56) References Cited

U.S. PATENT DOCUMENTS

2011/0014340 A1* 1/2011 Spitzley .................. A47J 31/20
426/433
2011/0030562 A1 2/2011 Ambrosini

OTHER PUBLICATIONS

International Search Report and written opinion of PCT/IB2016/051504 dated Jun. 28, 2016.
European Search Report of Italian priority application No. MI2015A000409 dated Oct. 19, 2015.

* cited by examiner

DEVICE FOR CLEANING A FILTER HOLDER OF A COFFEE MACHINE

RELATED APPLICATIONS

This application is the US national phase application of international application number PCT/IB2016/051504, filed 17 Mar. 2016, which designates the US and claims priority to Italian Application MI2015A000409 filed 17 Mar. 2015, the contents of each of which are hereby incorporated by reference as if set forth in their entireties.

FIELD OF THE INVENTION

The present invention relates to a device for cleaning a filter holder of a coffee machine and, in particular, of an espresso coffee machine.

BACKGROUND OF THE INVENTION

As known, nowadays, preparing a coffee beverage with espresso coffee machines involves cleaning the filter from the used coffee grounds after the preparation of every cup of coffee.

In fact, the dispensing cycle of coffee provides for the measure of powdered coffee contained in the filter holder and used for making the coffee to be compressed in the filter, infused with hot water and then completely removed from the filter holder so as to be able to perform a new dispensing cycle.

Usually, the removal of used coffee grounds is carried out manually by striking the filter holder against a knock bar placed inside a knock box.

This cleaning system is noisy, causes spurts of used coffee grounds all over and is never able to completely clean the filter that, consequently, from time to time has to be manually scraped with a brush.

Automated systems for cleaning the filter holder are also known that provide the use of an electric motor that rotates a brush or scraper.

Usually the motor is activated, through electrical means, by inserting the filter holder in a proper housing.

In case of automatic systems for cleaning the filter holder, the latter is positioned in the specific housing with its containment chamber for used coffee grounds facing downwards.

In this way, used coffee grounds are removed from the filter contained in the filter holder and can directly drop by gravity in a specific collection member for collecting the same.

The drawback of these automatic cleaning devices is that, as pointed out above, the filter holder has to always be rotated by 180° since it is extracted from the coffee machine until is introduced in the housing of the device in which it is cleaned.

Sometimes such a rotation, as easily understandable, causes the partial or total detachment of the used coffee grounds since, being wet, have remarkable weight.

The drop of the used coffee grounds dirties the support surface of the cleaning device or even the device itself, then forcing the operator to clean all the soiled parts.

In order to compensate for this shortcoming, devices have been implemented that provide for restraining the filter holder in the same position in which it is extracted from the coffee machine without subjecting it to rotation.

In such devices the removal of the used coffee grounds from the filter holder occurs by suction.

The latter cleaning devices, however, besides being expensive are not able to effectively clean the filter holder and, in addition, are easily subjected to breaking and malfunction since the ducts are probably blocked by the wet coffee grounds.

The task of the present invention is to implement a device for cleaning a filter holder of a coffee machine that is free from the afore complained drawbacks of the known art.

BRIEF SUMMARY OF THE INVENTION

In the scope of this technical task it is an object of the invention to implement a device for cleaning a filter holder of a coffee machine that avoids the need of rotating it by 180° with the risk of dropping the used coffee grounds contained within.

It is still another object of the present invention to implement a device for cleaning a filter holder of a coffee machine that allows orienting the filter holder in a position in which at least one wall of its chamber serves as support for the used coffee grounds, therefore preventing them from dropping.

It is still an object of the present invention to implement a device for cleaning a filter holder of a coffee machine that allows the removal of the used coffee grounds by using, for this purpose, the centrifugal force made by a rotor provided with various blades.

It is a further object of the present invention to implement a device for cleaning a filter holder of a coffee machine that allows optimizing the cleaning by combining the centrifugal force expelling the used coffee grounds also with a suction force still generated by the same rotor.

Not the last object of the present invention is to implement a device for cleaning a filter holder of a coffee machine that is highly simple and easy to use and that can be used as accessory for an espresso coffee machine or be integrated in the casing of the same.

This task, as well as these and other objects are reached by a device for cleaning a filter holder of a coffee machine comprising a support body for supporting the filter holder, a motor on whose shaft scraping means are assembled for removing the used coffee grounds contained in the internal chamber of the filter holder and at least one brush with a plurality of bristles to collect the residual of said used coffee grounds not collected by said scraping means, activation means for activating said motor and controlled by the correct positioning of said filter holder adapted to receive within it said scraping means and said at least one brush, a collection member being provided for collecting said used coffee grounds extracted from said filter holder by said scraping means, characterized in that said support body has a housing in which said filter holder is positioned so as to always have at least one wall of said chamber placed below said used coffee grounds and in that said scraping means have at least one plough blade to remove said used coffee grounds from said chamber along at least one direction different from that in which said used coffee grounds drop by gravity into said collection member.

Further characteristics of the invention are more pointed out in the dependent claims in which the members of the device according to the invention are shown in greater detail.

BRIEF DESCRIPTION OF THE SEVERAL VIEWS OF THE DRAWINGS

These characteristics and advantages of the present invention will be more evident by the following exemplary and not limitative description of preferred but not exclusive embodiments of a device for cleaning a filter holder of a coffee machine shown in the following figures, in which.

DETAILED DESCRIPTION OF THE INVENTION

Figure 1:
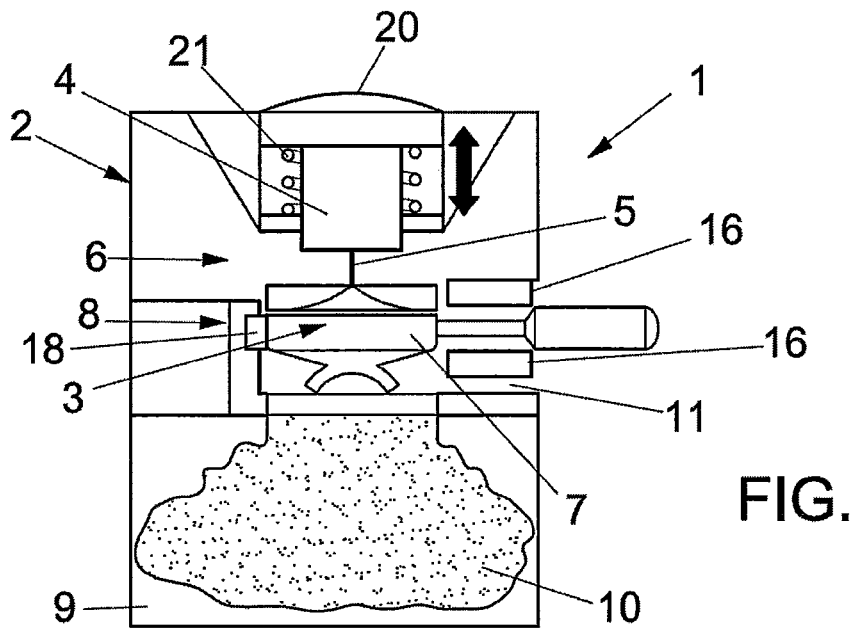
FIG. 1 is a sectioned side elevation view of the device according to the invention.

Referring particularly to the afore described figures, the device for cleaning a filter holder of a coffee machine is generically denoted with the reference numeral 1.

The device 1 comprises a support body 2 of the filter holder on the whole denoted with number 3 and a motor 4 on whose shaft 5 scraping means, generically denoted with number 6, are assembled to remove the used coffee grounds contained in the internal chamber 7 of the filter holder 3.

The device 1 further comprises activation means 8 for activating the motor 3 that can be directly controlled by the correct positioning of the filter holder 3, i.e. so as to receive the scraping means 6 within its chamber 7.

The device further provides a collection member 9 for collecting the used coffee grounds 10 that is extracted from the filter holder by the scraping means 6.

Advantageously, the support body 2 has a housing 11 in which the filter holder 3 is positioned so as to always have at least one wall of the chamber 7 placed beneath the used coffee grounds 10 in order to implement a valid restraint against the possible drop thereof during the filter holder manipulation.

In particular, as visible in FIG. 1, in case the filter holder 3 is inserted in the housing 11 with the chamber 7 facing upwards, the wall restraining the coffee grounds is defined by the base itself of the filter holder.

Figure 5:
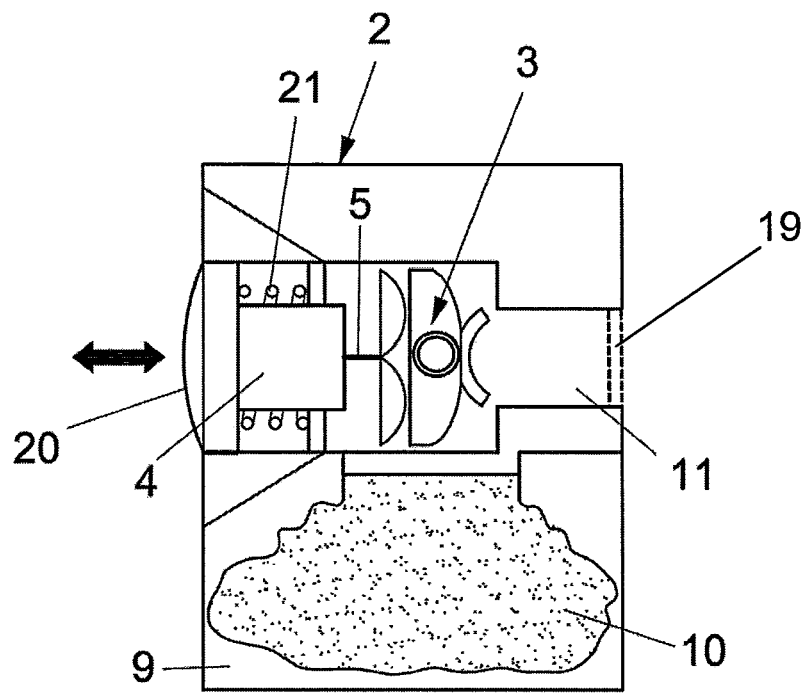
FIG. 5 shows a different embodiment of the device according to the invention in which the filter holder is rotated by 90° with respect to the removal position from the coffee machine.

In case the filter holder 3 is rotated by 90°, as schematically represented in FIG. 5, the restraining wall is defined by the side surface of the chamber 7. In this case one can indeed imagine of inserting the filter holder 3 in a housing 11 shaped so as to receive the filter holder 3 rotated by 90° and, possibly, closing at least partially the opening of the housing 11 by means of a cover 19, in order to avoid the used coffee grounds from dirtying the outside of the device 1 for cleaning the filter holder. Alternatively, the filter holder 3 can be inserted horizontally, as shown in FIG. 1, and then rotated by 90° to take the position shown in FIG. 5.

In this way, whichever the positioning of the filter holder is, facing upwards or placed upright, the drop of the wet used coffee grounds is avoided.

Therefore, during the cleaning of the filter holder, the scraping means 6 have at least one plough blade 12 to remove the used coffee grounds from the walls of the chamber along at least one direction different from that in which the used coffee grounds 10 drop by gravity into the collection member 9.

Figure 2:
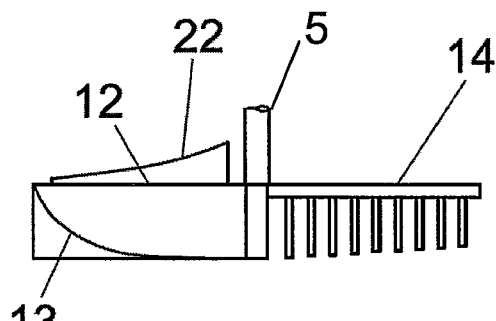
FIG. 2 is a partially sectioned side elevation view of one of the plough blades according to the invention.
Figure 3:
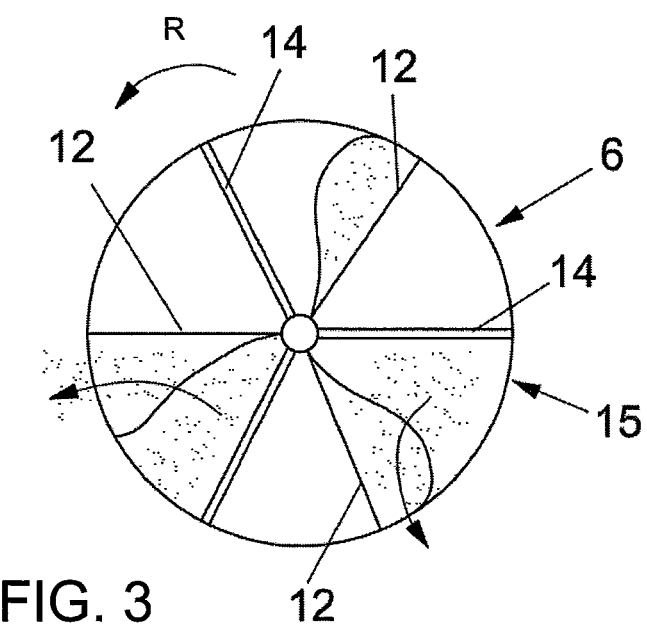
FIG. 3 is a plan view of the plough blades depicted in FIG. 2 according to the invention.

As shown in FIG. 2, the peculiarity of the plough blade 12 is to have a mouldboard shaped surface 13 adapted to take the used coffee grounds out of the chamber 7 and simultaneously tip them over its edges, external to it, to let them then drop in the collection member 9.

In other words, the scraping means according to the present invention comprise a first portion of the plough blade 12 substantially flat and with a slope, with respect to the bottom surface of the chamber 7 of the filter holder 3, comprised between 0° and 90°, preferably between 0° and 45°, more preferably between 0° and 20°. In addition, the scraping means further comprise a mouldboard shaped surface 13 with such a curvature to aid the movement of the material raised by the flat portion of the plough blade 12 externally, over the edges of the blade. In particular, according to a possible embodiment, the curvature radius of the mouldboard shaped surface 13 decreases from the center of rotation of the blade outwards.

In order to ensure a perfect cleaning of the chamber 7 by means of the total removal of the used coffee grounds 10, the plough blade 12 has at least one brush 14 with a plurality of bristles adapted to collect the residual of the used coffee grounds not collected by the mouldboard shaped surface 13. As visible in the figures, the brush is positioned and dimensioned so as to be inserted at least partially in the filter holder 3; the action of the brush on the walls of the filter holder is thus complementary and auxiliary to that of the blades.

Just for this reason, advantageously, the brush 14 is positioned subsequent to the mouldboard shaped surface 13 with respect to its direction of rotation.

In a preferred solution the scraping means 6 comprise various plough blades 12 and thus various mouldboard shaped surfaces 13 radially arranged so as to form a rotor, generically denoted with number 15, in which according to the needs various brushes 14 can be placed so as to combine the scraping and brushing of the walls of the chamber 7 in order to obtain a perfect cleaning thereof.

Figure 4:
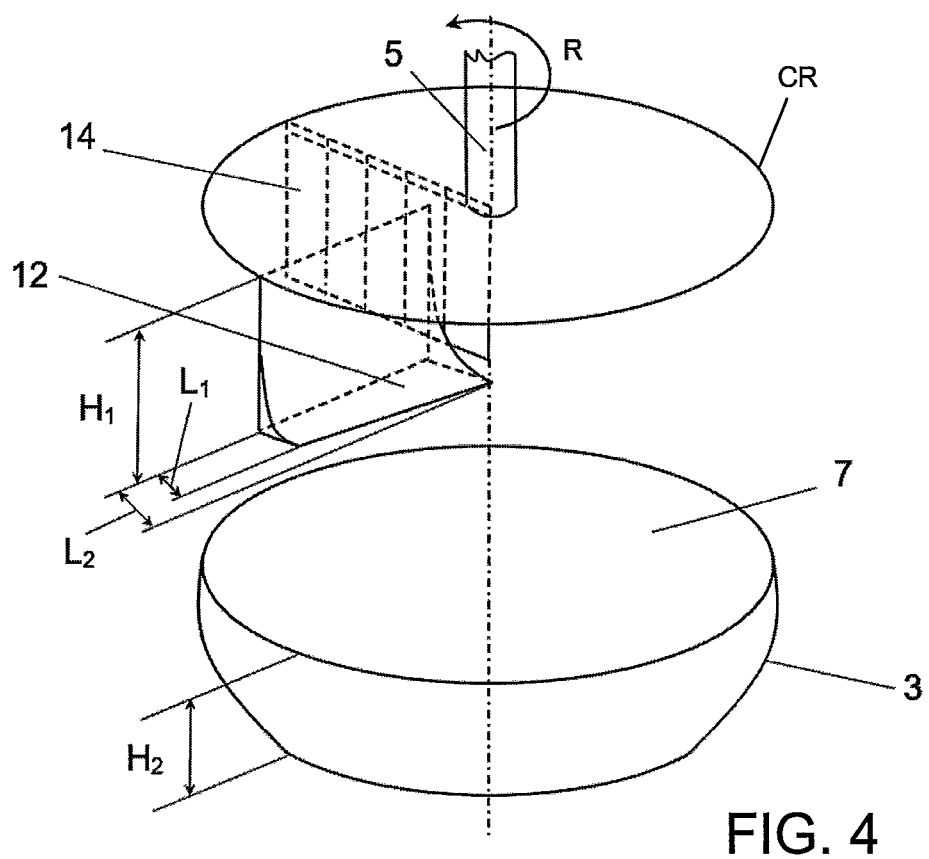
FIG. 4 shows an axonometric view of a possible embodiment of the scraping means and the brush according to the invention.

According to a possible alternative embodiment, the scraping means 6 and the brushes 14 inside the device 1 for cleaning the filter holder 3 can be arranged as shown in FIG. 4.

According to the embodiment shown in FIG. 4, the scraping means and the brushes are constrained to the rotating shaft 5 in accordance with the rotation way depicted by the arrow R. In FIG. 4 a plough blade 12 and a brush 14 are represented, in other implementations more than one plough blade and more than one brush, all constrained to the rotating shaft, can be provided. The plough blade and the brush are constrained above the shaft 5, for example by means of not depicted arms, and have a height H1 in the direction of the axis of the shaft 5 greater than the height H2 of the chamber 7 of the filter holder 3. Such a constraint allows the used coffee grounds to be dumped outside of the chamber 7 of the filter holder 3. Advantageously, the plough blade 12 has a curved surface so as to allow the collection and the dumping of the used coffee grounds 10 from the chamber 7 of the filter holder 3. In addition, the lower surface of the blade has two sides arranged along the direction of the rotation circumference CR; a first side is arranged internally and has a length L1 and a second side is arranged externally and has a length L2. Advantageously, the length L2 is greater than the length L1 so as to promote the dumping of the used coffee grounds outwards.

Conveniently, the activation means 8 for activating the motor 4 are placed inside the housing 11 in which the filter holder 3 is slidingly inserted, through apposite guides 16.

In this way, all the electromechanical operating part of the device is protected against dirty and possible impacts or tampering.

The activation means 8, in fact, comprise a limit switch 18 closing an electrical circuit when the filter holder is correctly positioned in the housing 11.

The limit switch drives the electrical circuit that, in turn, drives the motor 4 and thus the rotor 6 before the latter contacts the used coffee grounds so as to have sufficient speed for the removal thereof.

The movement of the motor 4 relating to the positioning of the filter holder 3 upwards or upright occurs with upright direction downwards or with horizontal direction, respectively, and can be manually managed by pushing the button 20 movable with respect to the countering support body 2 and by the action of a spring 21.

In this case, the pressure applied for cleaning the chamber 7 is adjusted by the operator as a function of the grain size and compression of the coffee grounds.

Alternatively, the movement system of the motor with the rotor can be automatized according to the currently used technique.

In an exemplary implementation with manual or, alternatively, automatic movement of the motor 4, an increase of the rotation speed of the motor 4 and its shaft 5 and thus the rotor 15, occurs simultaneously to the motor movement.

The rotor has fins 22 on top having dual purpose.

On one hand, they serve to cool the motor 4 and, on the other hand, create a suction of the used coffee grounds along a direction parallel to the rotation axis of the rotor, thereby facilitating the detachment and expulsion thereof from the chamber 7.

It has been in practice noted how the device for cleaning a filter holder of a coffee machine according to the invention is particularly advantageous in order to not fatigue the operator during the working day and to ensure an absolute cleaning of the filter holder by avoiding its manipulation from unintentionally dropping the used coffee grounds in the activity zone.

The so-designated device for cleaning a filter holder of a coffee machine is susceptible of a number of changes and variations all falling in the scope of the inventive conception.

For example, upon the needs and the available room in which the device is arranged, the cleaning of the filter holder can be carried out with orientation upwards or upright without unintentional drops of the used coffee grounds.

Furthermore, all the details can be replaced by technically equivalent members. In practice the used materials, as well as the size, can be any according the needs and the state of the art.

The invention claimed is:

1. Device (1) for cleaning a filter holder (3) of a coffee machine comprising a support body (2) for supporting the filter holder (3), a motor (4) on whose shaft (5) scraping means (6) are assembled for removing used coffee grounds (10) contained in an internal chamber (7) of said filter holder (3) and a collection member (9) for collecting said used coffee grounds (10) extracted from said filter holder (3) by said scraping means (6), characterized by comprising at least one brush (14) provided with a plurality of bristles adapted to collect used coffee grounds (10) not collected by said scraping means (6), activation means (8) for activating said motor (4) and controlled by the correct positioning of said filter holder (3) adapted to receive said scraping means within it and said at least one brush (14), said support body (2) having a housing (11) in which said filter holder (3) is positioned so as to always have at least one wall of said chamber (7) placed below said used coffee grounds (10), wherein said scraping means (6) have at least one plough blade (12) with a mouldboard shaped surface (13) adapted to take said used coffee grounds (10) out of said chamber (7) and raise them to tip them over its edges external to it, wherein said mouldboard shape surface (13) is characterized by a curvature capable to removing said used coffee grounds raised by said plough blade (12) externally, over the edges of said plough blade.

2. Device (1) for cleaning a filter holder (3) of a coffee machine according to claim 1, wherein said used coffee grounds (10) are extracted from said chamber (7) of said filter holder (3) by said scraping means (6) along at least one direction different from that in which said used coffee grounds (10) drop by gravity into said collection member (9).

3. Device (1) for cleaning filter holder (3) of a coffee machine according to claim 1, wherein said brush (14) is positioned subsequent to said mouldboard shaped surface (13).

4. Device (1) for cleaning a filter holder (3) of a coffee machine according to claim 1, said scraping means comprising various plough blades (12) arranged radially to one another in order to form a rotor (15).

5. Device (1) for cleaning a filter holder (3) of a coffee machine according to claim 4, wherein said rotor (15) comprises said at least one brush (14).

6. Device (1) for cleaning a filter holder (3) of a coffee machine according to claim 1, characterized in that said activation means (8) for activating said motor (4) are placed within said housing (11) of said support body (2).

7. Device (1) for cleaning a filter holder (3) of a coffee machine according to claim 6, characterized in that said activation means (8) comprise a limit switch (18) that closes an electrical circuit when said filter holder (3) is correctly positioned in said housing, said electrical circuit activating the movement of said motor (4) and said rotor (15) towards the inside of said chamber (7).

8. Device (1) for cleaning a filter holder (3) of a coffee machine according to claim 7, characterized in that said motor (4) increases its rotation speed during said movement.

9. Device (1) for cleaning a filter holder (3) of a coffee machine according to claim 8, characterized in that said rotor (15) has a plurality of fins (22) adapted to create the suction of said used coffee grounds (10) along a direction parallel to the axis of rotation of said shaft (5).

* * * * *